United States Patent [19]

Seyler

[11] Patent Number: 4,817,262
[45] Date of Patent: Apr. 4, 1989

[54] PAINT DRAIN CLOSURE ATTACHING METHOD

[75] Inventor: Peter G. Seyler, Franklin Park, Ill.

[73] Assignee: Perfection Spring & Stamping Corp., Mt. Prospect, Ill.

[21] Appl. No.: 80,863

[22] Filed: Aug. 3, 1987

Related U.S. Application Data

[60] Division of Ser. No. 915,728, Oct. 6, 1986, Pat. No. 4,700,981, which is a continuation-in-part of Ser. No. 794,653, Nov. 4, 1985, abandoned.

[51] Int. Cl.$^4$ .................... B23P 25/00; B21D 35/00
[52] U.S. Cl. .................................... 29/458; 29/469.5
[58] Field of Search ................... 29/509, 523, 522 R, 29/522 A, 243.52, 283.5, 458, 469.5; 296/1 F, 1 R, 208, 191; 220/293-295, 298, 309, 310, 304, 362, 364; 49/476; 156/69, 295

[56] References Cited

U.S. PATENT DOCUMENTS

| | | | |
|---|---|---|---|
| 2,492,883 | 12/1949 | O'Neil | 220/364 |
| 2,826,328 | 3/1958 | Moen et al. | 220/293 |
| 3,015,682 | 1/1962 | Cheske | 29/523 UX |
| 3,084,826 | 4/1963 | Ericson | 29/512 UX |
| 3,158,176 | 11/1964 | Toland | 49/476 X |
| 3,606,446 | 9/1971 | Leslie | 296/208 |
| 3,701,560 | 10/1972 | Emmerson | 296/1 R |
| 3,935,686 | 2/1976 | Dozoes | 49/476 X |
| 4,000,708 | 1/1977 | Hardt | 29/523 X |
| 4,176,877 | 12/1979 | Schulz | 296/208 |
| 4,363,420 | 12/1982 | Andrews | 220/364 X |

FOREIGN PATENT DOCUMENTS 252937 6/1926 United Kingdom ................ 220/298

Primary Examiner—Charlie T. Moon
Attorney, Agent, or Firm—Tilton, Fallon, Lungmus

[57] ABSTRACT

An improved closure for sealing the paint drain holes of a vehicle body, and a tool and method of use therefor, are disclosed. The closure takes the form of a one-piece sheet metal plug of inverted hat-shaped configuration having a peripheral flange with a thermoplastic sealant ring located beneath the flange to form a hermetic seal about the opening of the vehicle body. In use, the closure is supported, preferably magnetically, by the head of an insertion tool and is directed by that tool into a floor pan opening or other panel opening of a vehicle body. Depending on the shape of the panel opening, the plug is then temporarily secured in place, with the sealant ring clamped between the flange of the plug and the body panel, either by a partial turn of the plug or by a tool with cam-driven dimpling elements that are forced outwardly within the cavity of the plug to produce a plurality of external enlargments or nubs. The same closure plug may be used for either type of attachment and, following such attachment, the entire assembly is heated (in the normal baking cycle of the painting operation) to soften and expand the sealant ring and produces a permanent adhesive bond between the parts. The use of the paint drain openings to support and position a vehicle prior to plug insertion and attachment is also disclosed.

1 Claim, 5 Drawing Sheets

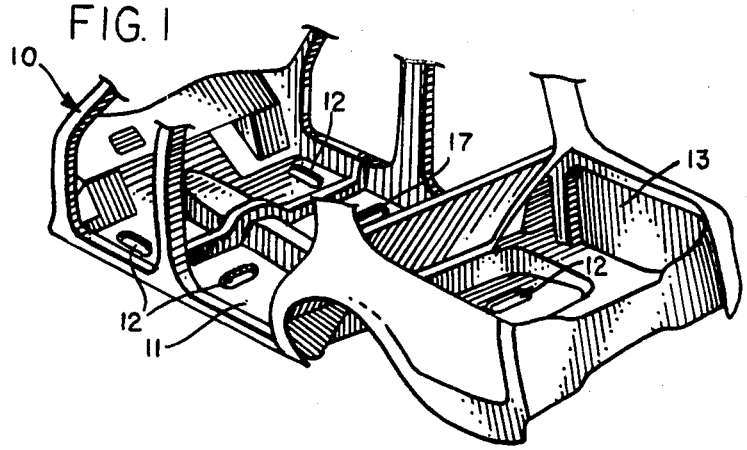
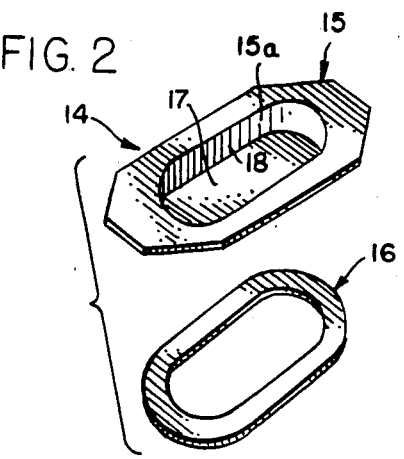
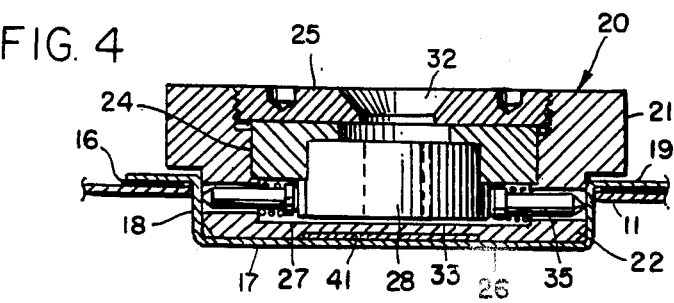
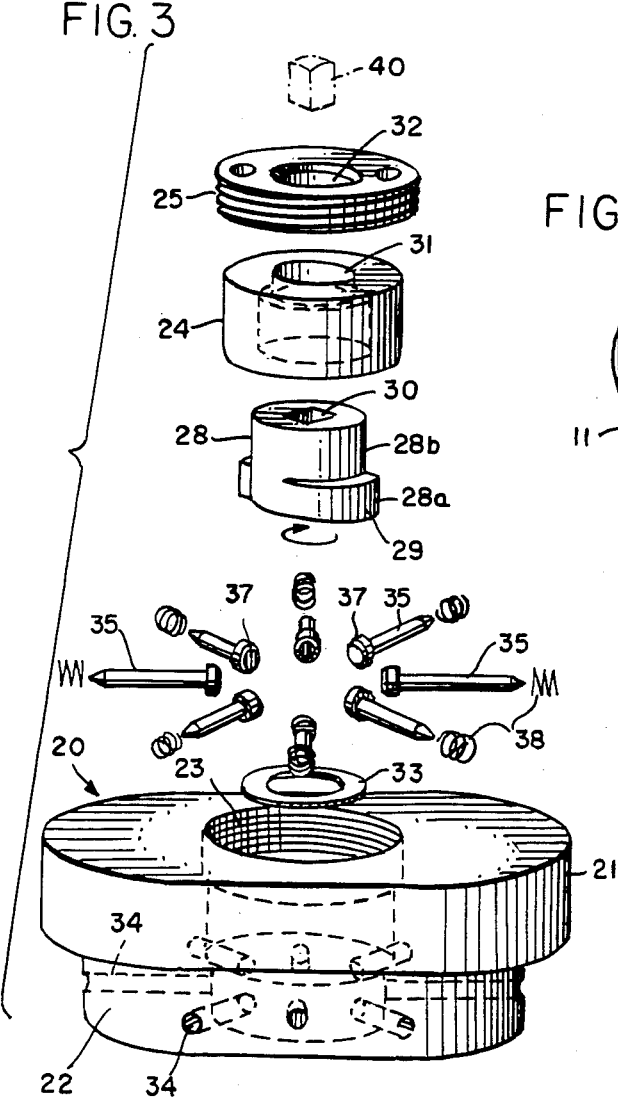
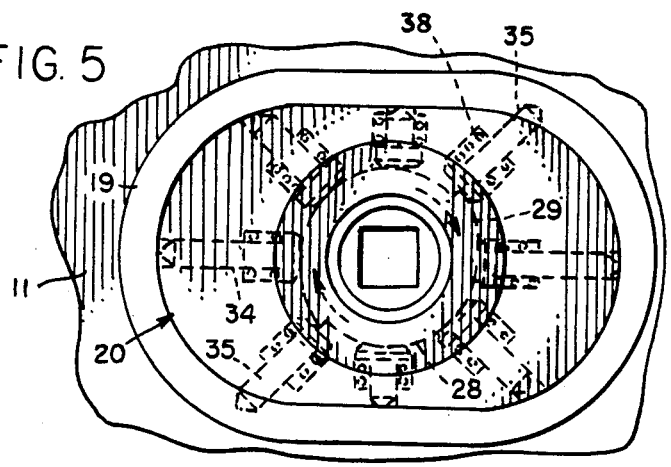
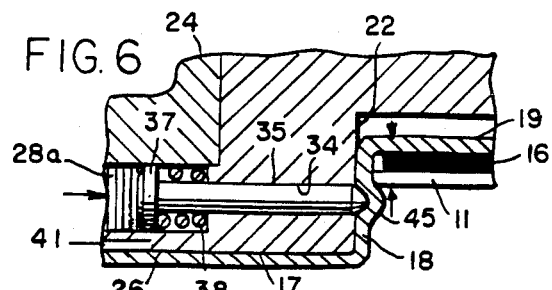
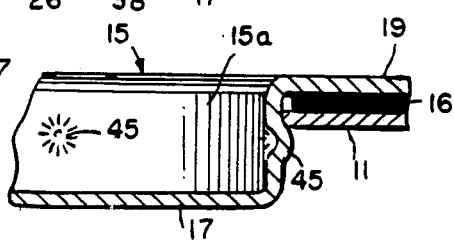

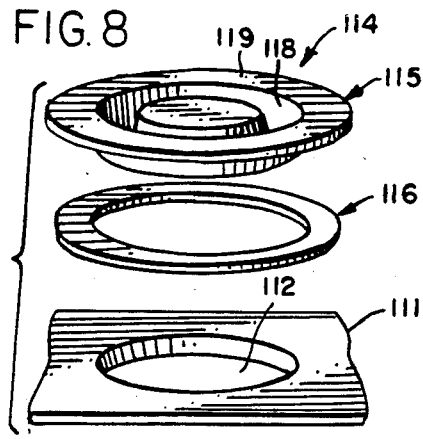
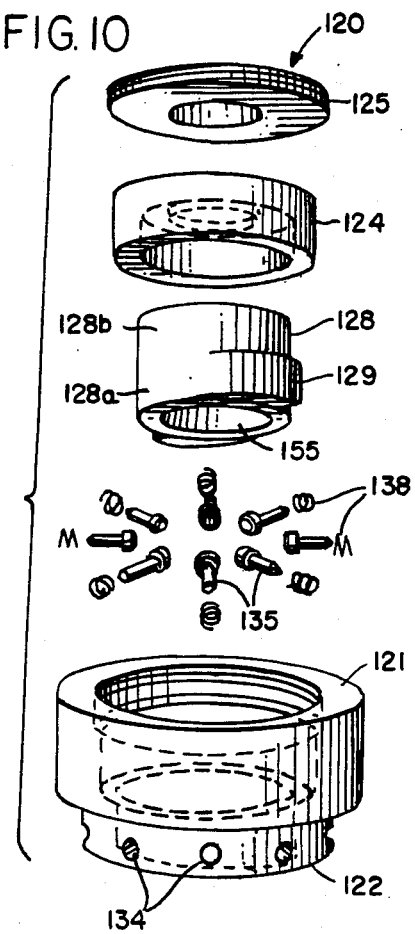
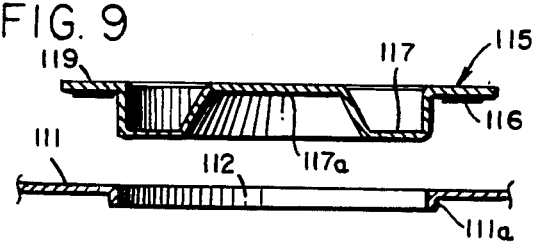
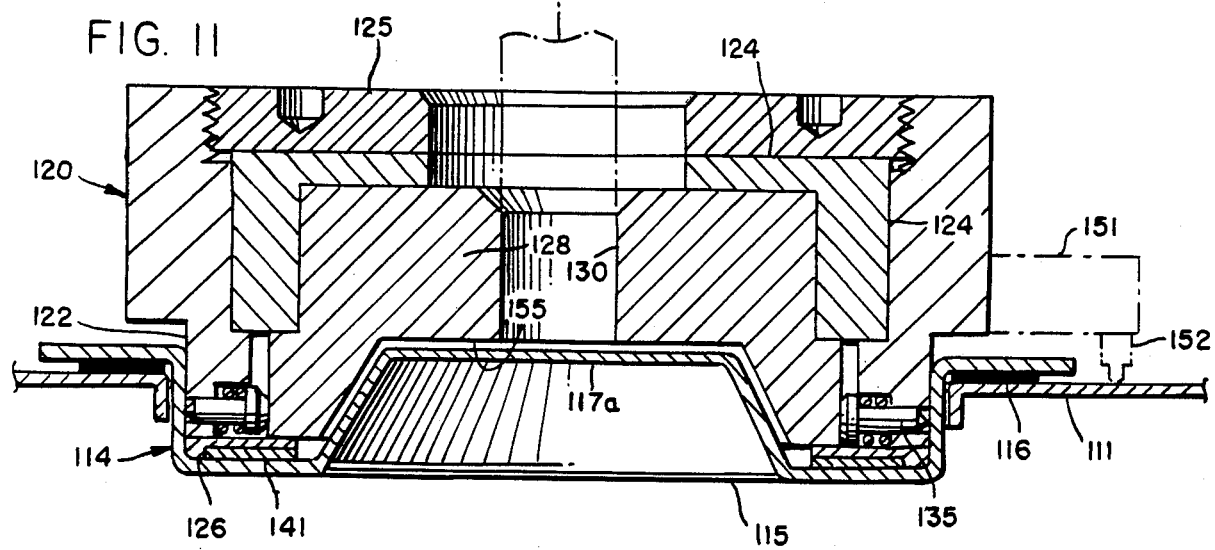

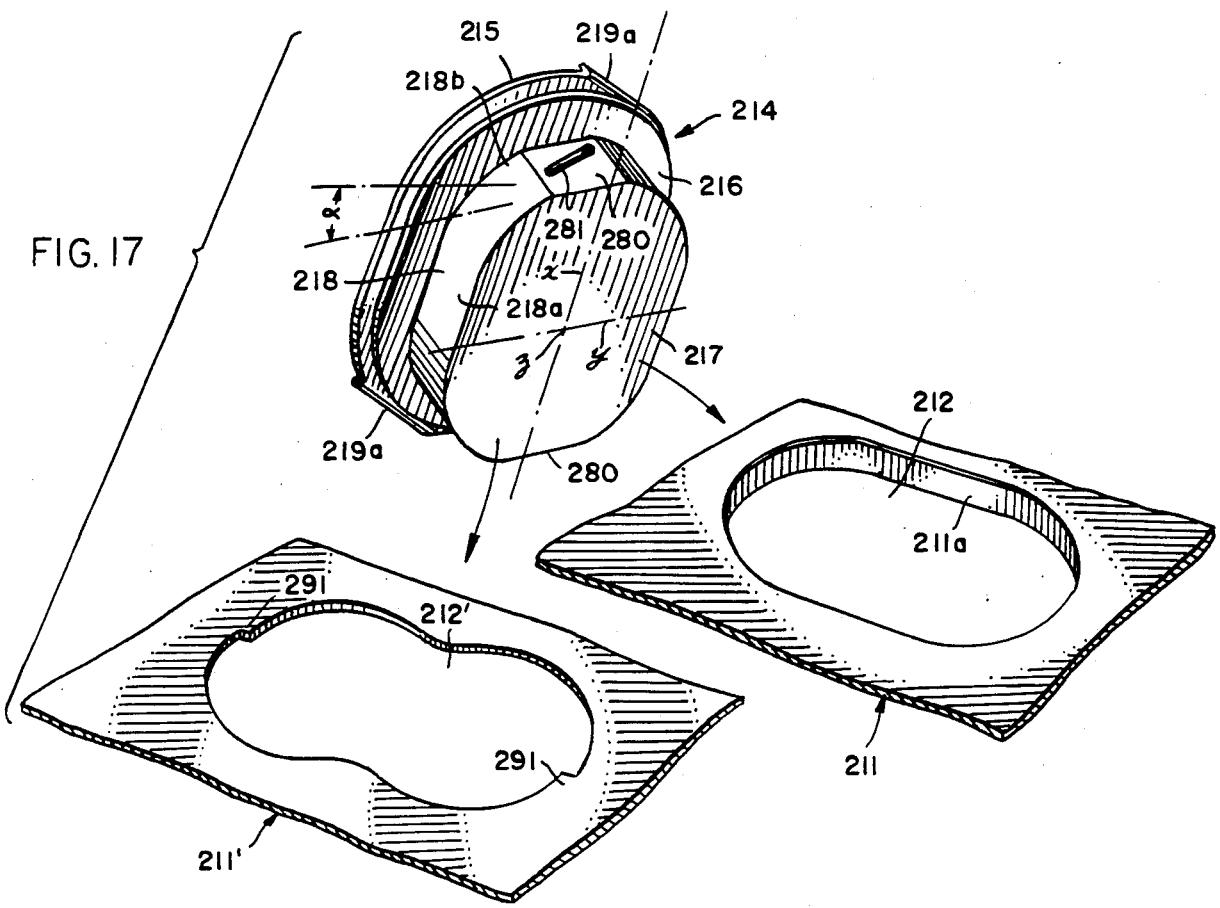
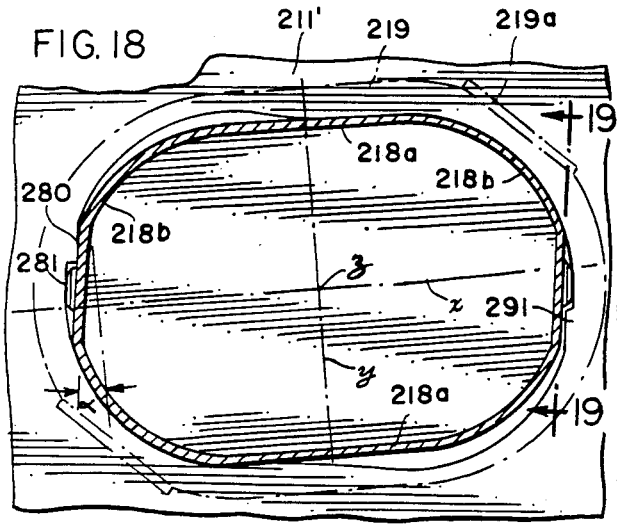
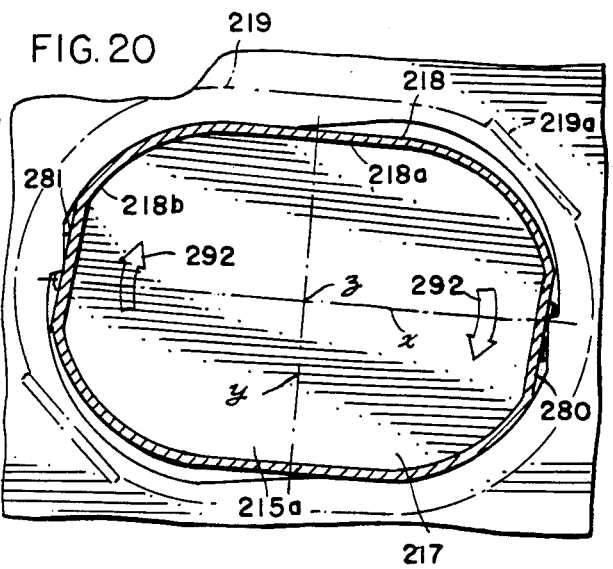
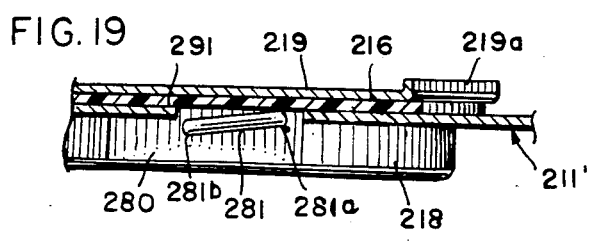
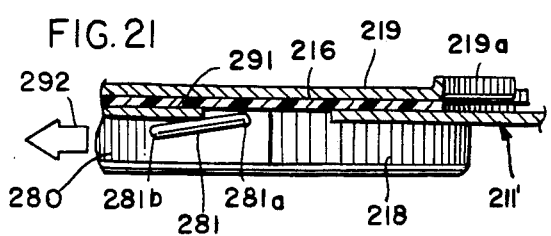

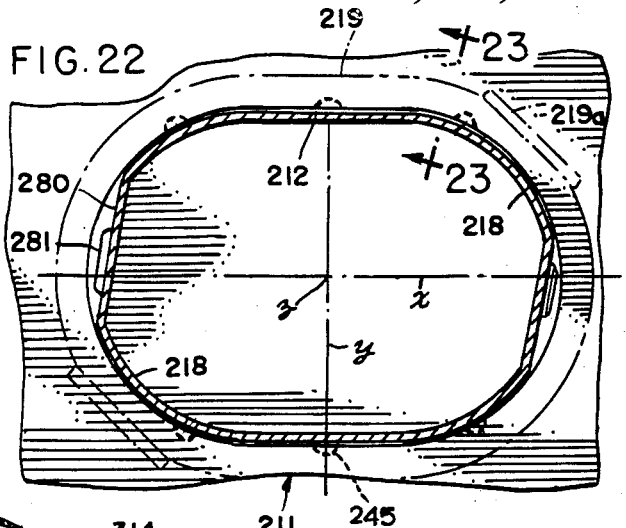
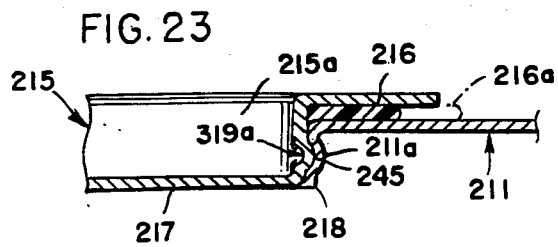
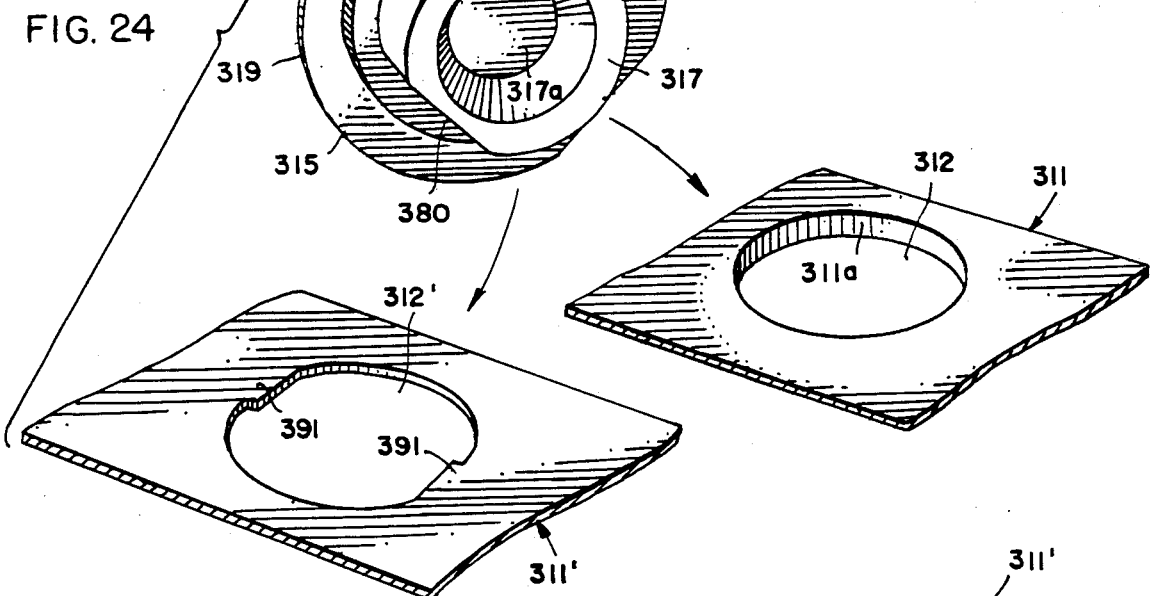
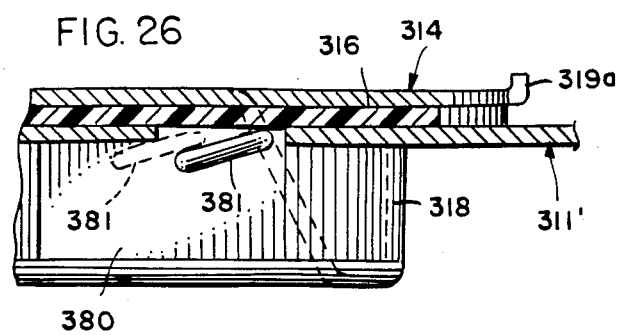
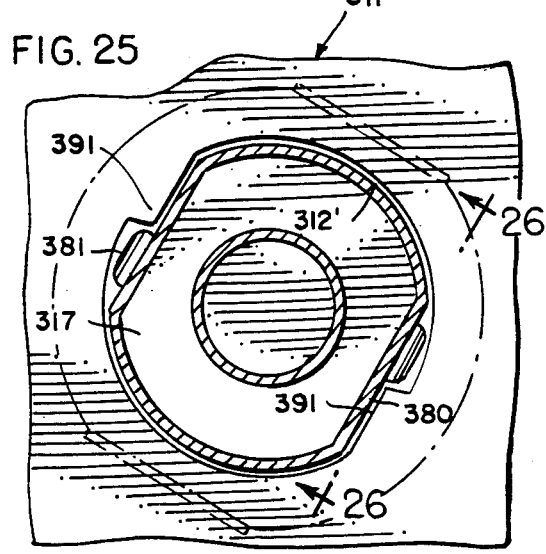

PAINT DRAIN CLOSURE ATTACHING METHOD

RELATED APPLICATION

This application is a division of application Ser. No. 915,728, filed Oct. 6, 1986, now U.S. Pat. No. 4,700,981, which is a continuation-in-part of application Ser. No. 794,653, filed Nov. 4, 1985, now abandoned.

BACKGROUND AND SUMMARY

At an early stage in their manufacture, vehicle bodies are commonly dipped in one or more treatment baths containing cleaners, rust inhibitors, and primers. As the vehicle body leaves such a bath, excess liquid must be drained quickly from its sheet metal surfaces so that the body may be advanced into a drying oven and proceed to further processing stations. To facilitate the draining of the coating materials (generally referred to herein as "paints"), such a body is provided with drain openings. It is essential that those openings later be sealed in order to prevent carbon monoxide and water from entering the passenger compartment when the completed vehicle is put to use. For that purpose, and to help reduce noise transmission, protective shields are clipped in place over the drain openings and sealant pads or covers are then applied over the seams or joints between the shields and the body panels in which the drain openings are provided.

The shields with their spring clips have the disadvantages of being relatively expensive to make. Also, because they rely on spring elements to hold them in position, at least initially, there is some risk that they might not be securely attached during installation or become detached following installation. While such risks are reduced by the sealant covers that are subsequently applied over each shield, the need to apply such covers in subsequent operations is also undesirable because it increases production and labor costs. A main aspect of this invention lies in providing an improved system for sealing such paint drain openings of automotive vehicles. The closure used for that purpose is relatively simple in construction and is easily and quickly applied either by robot or by a worker using suitable power equipment. The closure is initially retained in place only by a positive interlock between the parts, but that interlock is capable of withstanding removal forces far greater than those to which the finished assembly would normally be subjected. A highly effective hermetic permanent seal is then formed during a subsequent baking or heat-drying operation in which a thermoplastic adhesive ring or gasket, interposed between the flange of the sealant plug and the surface of the body panel about the drain opening, is softened. Since the thermoplastic sealant ring is pre-mounted upon the sheet metal plug, the plug and ring (together referred to as the "closure") are installed simultaneously, thereby reducing manipulative steps and production costs.

Briefly, the plug is formed from a single piece of deformable sheet metal, is of inverted hat-shaped configuration, and has an imperforate bottom wall, a continuous side wall extending upwardly from the periphery of the side wall, and a flat perimetric flange extending outwardly from the upper limits of the side wall. A thermoplastic sealant ring is secured to the underside of the flange.

The plug is preferably circular or oval in shape and has a bottom wall that may be flat although, ideally, it is dome-shaped with the central portion of the dome being at the same level as the perimetric flange. In a preferred embodiment, the side wall has at least a pair of perimetrically-spaced indentations or recesses extending to the plug's bottom surface. Integral protuberances are disposed in those indentations, the protuberances extending outwardly a distance that does not exceed a circumscribing projection of the contour of the surfaces of the side wall immediately adjacent each indentation. Such a plug is "universal" in its application to the extent that it may be locked in a panel opening of regular oval or circular contour by the outward dimpling of the plug's side wall or, alternatively, in an opening that is of regular or oval shape except for the provision of circumferentially-spaced locking tabs or shoulders that engage the protrusions of the plug to securely hold the plug in place after it has been inserted and rotated a small fraction of one full turn.

The dimpling tool for applying the closure plug has a head that is dimensioned to be inserted into the cavity of the plug. Magnetic elements or other suitable means are used for temporarily holding the closure upon the head of the tool. By automation or manual guidance, the tool is directed to insert the bottom and side walls downwardly into a drain opening. When fully inserted in the opening, the sealant ring carried along the underside of the flange engages the upper surface of the body panel and the side wall of the plug extends downwardly beyond the body opening. With the head of the tool remaining within the cavity of the plug, the tool is actuated to force a plurality of cam-driven dimpling elements radially outwardly to deform the side wall of the plug and produce external nubs or projections that tightly clamp the plug in position.

The closure and its method of attachment are ideally suited for automation. The same holes or openings used for the draining of paint prior to attachment of the closures may be used for supporting, guiding, and positioning the vehicle body. Precise location of the body may be achieved utilizing the drain holes and, with the body so positioned, the holes may be automatically plugged and sealed in the manner described.

Other advantages, features, and objects of the invention will become apparent from the drawings and specification.

BRIEF DESCRIPTION OF DRAWINGS

FIG. 1 is a fragmentary perspective view illustrating a typical vehicle body equipped with a plurality of drain holes.

FIG. 2 is an exploded perspective view of a paint drain closure embodying this invention.

FIG. 3 is an exploded perspective view of a tool for attaching the closure of FIG. 2.

FIG. 4 is a sectional vertical view of the tool positioned for attachment of a closure to the floor pan of a vehicle body.

FIG. 5 is a top plan view of the tool.

FIG. 6 is an enlarged fragmentary sectional view illustrating the actions that occur upon operation of the tool.

FIG. 7 is a sectional view similar to FIG. 6 but illustrating the closure in fully installed condition with the attachment tool removed.

FIG. 8 is an exploded perspective view of a second embodiment of a closure, such closure being shown in association with a portion of the floor pan of a vehicle body provided with a drain hole.

FIG. 9 is a sectional view showing the closure of FIG. 8 in assembled condition and also showing a section of the apertured floor pan to which the closure may be connected.

FIG. 10 is an exploded perspective view showing a tool for use in attaching the closure of FIGS. 8 and 9.

FIG. 11 is an enlarged sectional view showing the tool being utilized for attaching the modified closure.

FIG. 17 is a perspective view illustrating a drain plug constituting a preferred embodiment of the invention and showing two types of body panel openings into which the drain plug may be secured.

FIG. 18 is a top plan view of one type of drain opening showing the plug of FIG. 17 in horizontal section immediately following insertion of such a plug into the opening. The flange of the plug is illustrated in phantom.

FIG. 19 is an enlarged vertical sectional view taken from the direction of line 19—19 in FIG. 18.

FIG. 20 is a view similar to FIG. 18 but illustrating the drain plug after it has been rotated into its locked position.

FIG. 21 is a sectional view similar to FIG. 19 but showing the plug in its locked condition.

FIG. 22 is a plan view of a body panel having the other type of opening shown in FIG. 17, the drain plug being shown following the inserting and dimpling steps.

FIG. 23 is an enlarged fragmentary sectional view taken along line 23—23 of FIG. 22.

FIG. 24 is a perspective view of a circular drain plug also constituting a preferred embodiment of the invention, the plug being shown in conjunction with two types of body panel openings in which it is capable of being received and interlocked.

FIG. 25 is a plan view of one of the body panels shown in FIG. 24 with the plug as it would appear in section immediately following insertion into the drain opening.

FIG. 26 is an enlarged fragmentary sectional view taken from the direction of line 26—26 in FIG. 25.

DETAILED DESCRIPTION OF PREFERRED EMBODIMENTS

Figure 12:
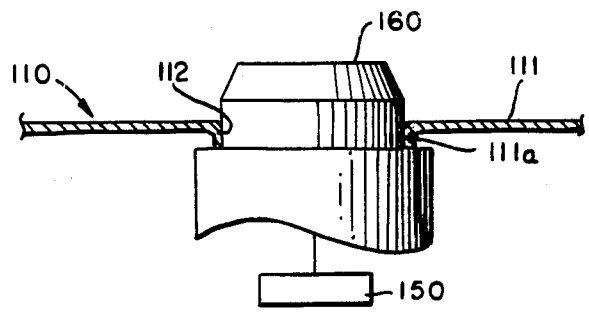
FIGS. 12–16 illustrate successive steps of a method involving the use of the modified closure.
Figure 13:
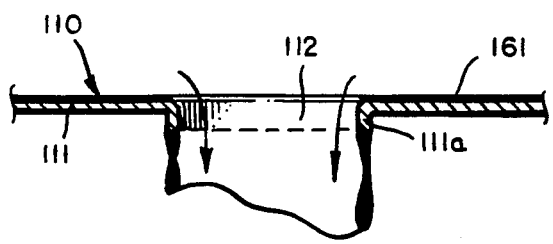

FIG. 1 illustrates a typical vehicle body at a stage ready for dipping into one or more treatment baths. The body 10 includes a floor pan or panel 11 provided with a plurality of oval-shaped drain openings 12 formed therein. A similar opening is also formed in the trunk area 13.

The closure 14 shown most clearly in FIG. 2 takes the form of a sheet metal plug 15 and a thermoplastic sealing ring 16. Any suitable thermoplastic adhesive material capable of softening, and preferably also expanding in volume, at the heating or baking temperatures selected for drying the paint applied to the body 10 during the dipping process may be used, such expandable thermoplastic adhesives being well known in the art.

The plug 15 is stamped from sheet steel or other tough, deformable metal, preferably a metal that is magnetically attractable. The plug includes a planar imperforate bottom wall 17, a continuous side wall 18 projecting upwardly from the periphery of the bottom wall and extending at substantially right angles to the bottom wall, and a flat perimetric flange 19 projecting outwardly from the upper end of side wall 18. The thermoplastic sealing ring 16 is shown separated from the plug in the exploded view of FIG. 2, but it is to be understood that the closure 14 is supplied to the user with the ring 16 secured to the underside of flange 19. Such attachment may be achieved by the use of adhesives or by any other suitable means.

FIGS. 3–5 illustrate the attachment tool 20 for securing closure 14 in place. The tool includes a body 21 having a head 22 dimensioned to be received within the cavity 15a of plug 15. The fit should be close without producing significant frictional resistance to insertion and removal of the head from the cavity. A cylindrical bore 23 within the body and head supports a bushing 24, and the upper end of the bore is threaded and is closed by an apertured, threaded end cap 25. The lower end of the bore is closed by end wall 26.

Directly above the end wall 26 within head 22 is a chamber 27 that receives the lower end portion 28a of a rotary cam member 28. The cylindrical upper end portion 28b of the cam is rotatably received within bushing 24; however, the lower portion 28a of the cam extends below the bushing and is provided with one or more lobes 29. In the embodiment illustrated, the cam is provided with a pair of diametrically-disposed lobes but a greater or smaller number may be provided as desired. A socket 30 of non-circular (square) cross section extends through the cam and is accessible through openings 31 and 32 in the bushing and end cap, respectively (FIG. 3). If desired, a suitable thrust bearing in the form of shim 33 may be positioned in chamber 27 between the cam member 28 and end wall 26.

A plurality of radial openings or passages 34 extend completely through the side wall of the head 22. At least two such openings 34 should be provided and a greater number may be advantageous, a total of eight being shown in the drawings. Each opening or passage slidably receives the shank of a hardened pin or dimpling element 35. The outer end of each pin is pointed, as depicted in FIGS. 3 and 6, and its inner end is enlarged to provide a head 37. A spring 38 normally urges each pin inwardly into a retracted position but, as shown in FIG. 6, when the cam 28 rotates the lobes 29 drive each pin outwardly into an extended position. When each pin is so extended, its pointed tip protrudes radially outwardly beyond head 22, whereas when the pin is retracted its pointed tip is withdrawn into passage 34.

The tool is operated by a power-driven shaft 40 (FIG. 3) that may be part of a hand-held ratchet operated pneumatically, electrically, or hydraulically, or as part of a fully automated robotic unit. In any case, a closure 14, consisting of plug 15 and its sealant ring 16, is fitted onto the head 22 of the tool and is preferably retained in place upon the head by magnetic means. For that purpose, one or more magnets 41 may be embedded or secured to the end wall 26 of the head, or the entire end wall may be formed of magnetic material. Alternatively, other means may be used for temporarily retaining the closure 14 upon head 22. For example, a low level of driving force may be applied to the cam 28 to cause one or more of the pins 35 to shift outwardly with sufficient force to engage and retain the closure but not forcefully enough to deform the side wall of plug 15.

The tool 20 is then used to direct the closure into the position shown in FIG. 4 with the side wall of the plug extending downwardly through the drain opening 12 and with sealant ring 16 sandwiched between flange 19 and floor pan 11. The cam 28 is then forcefully rotated to drive pins 35 outwardly to deform side wall 18 below pan 11. The action is illustrated in FIG. 6 where it will be seen that the pointed ends of the pins form dimples at circumferentially-spaced points along the inner surface of the side wall 18 and outward protrusions or nubs 45 at corresponding points along the outer surface of the side wall. The parts are dimensioned so that pan 11 and sealant ring 16 are clamped tightly between flange 19 and nubs 45. The tool is then removed, leaving the dimpled closure 14 locked securely in place (FIG. 7).

In the embodiment of FIGS. 8–11, closure 114 is circular rather than oval in configuration. Plug 115 is provided with a bottom wall 117, a circular side wall 118, and an outwardly-projecting flange 119. Unlike the plug of the first embodiment, plug 115 has its bottom wall centrally domed at 117a so that the upper surface of the domed portion lies along the same plane as the upper surface of flange 119. Sealant ring 116 is circular in shape and is secured to the underside of flange 119 as shown in FIG. 9. The floor pan 111 of the vehicle includes circular drain openings 112. To provide greater strength, and for other reasons hereinafter described, the floor pan 111 preferably has a downwardly projecting rim or lip 111a.

Tool 120 is similar to tool 20 except that it is adapted for use with a circular closure that has a domed bottom wall. Like tool 20, tool 120 includes a body 121, a head portion 122, a cam 128 with lobes 129 rotatable within the head, a bushing 124, and an end cap 125. Pins 135 reciprocate within radial openings or passages 134 with return springs 138 urging the pins into their retracted positions. Suitable drive mechanism 150, preferably as part of a totally automated system (i.e., a robot) may be coupled to the tool as shown in FIG. 11 although, as previously described, the tool may also be connected to a hand-held power ratchet. Where a robotic system is utilized, tool 120 may be equipped with a sensor 151 having a detecting element 152 for sensing when a closure 114 carried by the head of tool 120 has been fully inserted into the opening of pan 111.

It will be observed that the end wall 126 of head 122 is annular, defining a central opening 154 through which the domed portion 117a of the plug 115 may project. Similarly, the undersurface of cam 128 is recessed at 155 to accommodate the central domed portion of the plug.

Figure 14:
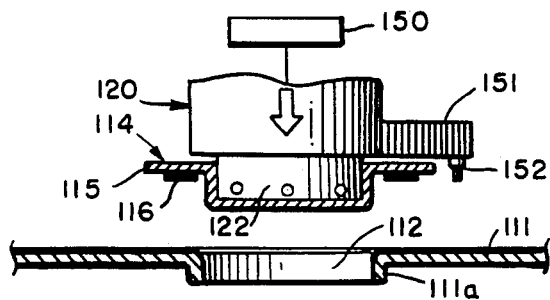
Figure 15:
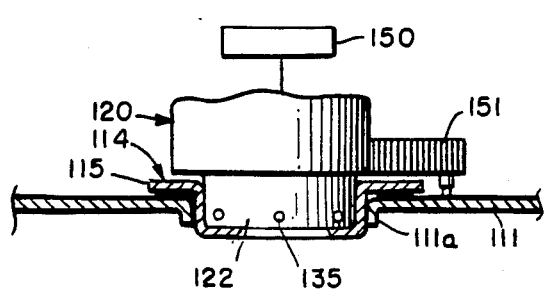

FIGS. 12–16 illustrate somewhat schematically the method of use of the tool 120 and closure 114 of the second embodiment with an additional step, illustrated in FIG. 12, revealing that the reinforced openings 112 of the vehicle body may be used not only for drain purposes but also to precisely orient the body for subsequent operating steps, including the steps of inserting and expanding the plug 115 of closure 114. Thus, pins 160 of an automated system may be used to support, or help support, and to precisely locate body 110 as it advances along the line. The pins may be part of the same robot system later used to insert and expand plugs 115. Following a dipping operation in which a primer 161 or other treatment material coats the surfaces of the body and excess material is allowed to drain through openings 112 (FIG. 13), tools 120 carried by the arms of robot system 150 insert the plugs of closures 114 (FIGS. 14–15). The circular shape of the plugs facilitates proper insertion, with sensing means 151 establishing when such insertion has occurred and plug expansion, by means of power-driven cam 128 and pins 135 may take place. Following the insertion and expansion steps, the body may then be advanced through an oven where the thermoplastic material of ring 116 softens and produces a hermetic seal between panel or pan 111 and the flange 119 of closure 114. Because the upper surface of domed portion 117a is of the same elevation as flange 119, that surface may perform a supportive function, partially filling the depression defined by the inverted hat-shaped plug 115.

While the tools of both embodiments have been shown with pins 35 and 135 slidably received in passages 34 and 134 of heads 22 and 122, respectively, it is to be understood that the plug-deforming elements need not be in the form of pins but might, for example, consist of one or more hardened steel balls or bearings that shift between extended and retracted positions as the cams 28 and 128 are actuated.

In a preferred embodiment shown in FIGS. 17–23, the closure 214 is generally similar in construction to the closure already described with respect to FIGS. 2–7, except that it is provided with features which give it dual functions. Again, the drain plug 215 is of inverted hat-shaped configuration with a continuous side wall 218, a bottom wall 217, and a perimetric flange 219. A sealant ring 216 of expandable thermoplastic material is secured to the underside of the generally planar flange 219. The side wall 218 is generally oval-shaped in outline, having a longitudinal major axis x, a transverse minor axis y, and a center of rotation z where the two axes intersect. Because of the oval-shaped outline of the closure, the side wall includes straight longitudinal side wall portions 218a and rounded end portions 218b.

As shown most clearly in FIGS. 17, 18, and 20, the smooth curvature of the rounded end portions 218b of side wall 218 is broken by a pair of diametrically-disposed indentations 280. In the illustration given, the side wall surfaces defining the indentations extend along parallel vertical planes except for ribs or protuberances 281 which are formed integrally with the side wall and project outwardly into the spaces defined by the indentations. It will be observed that the extent of outward projection of the ribs is limited and, specifically, that the outer limits of such ribs are circumscribed by projected continuations of the curvature of the side wall 218. Also, the vertical planar surfaces of the indentations 280 that surround ribs 281, although equidistant from the vertical axis of rotation z, are not normal or perpendicular to longitudinal axis x. Instead, each planar surface of indentation lies along a plane that extends at an angle α within the range of about 5 to 15 degrees in relation to a vertical plane normal to longitudinal axis x.

Each rib 281 is elongated with its longitudinal axis extending at an angle in relation to the plane of top flange 219. Specifically, each camming rib has a proximal end 281a and a distal end 281b with the proximal end being spaced closer to the plane of the perimetric flange than the combined thickness of sealant ring 216 and the vehicle body panel. An angle of slope within the range of about 3 to 12 degrees has been found effective. The top flange 219 is preferably provided with gripping means in the form of a pair of diametrically-disposed upturned edge portions 219a at opposite ends of the oval-shaped plug.

The closure 214 is intended to be received in the drain opening 212 of a vehicle body panel 211 in the same manner described in connection with the previous embodiments. The body panel is provided with a depending lip or rim 211a about opening 212 to provide greater strength, especially where the opening is intended to receive support pins for supporting and positioning the vehicle body during manufacture. It will be noted from FIGS. 17 and 22 that the oval opening 212 is of regular shape; that is, it corresponds to the oval configuration of the plug's side wall 218 (and bottom wall 217), including the projected continuations of curvature of that side wall. The smooth curvature of the rim or lip 211a therefore circumscribes the side wall 218 when the plug is inserted into opening 212, with the depending lip or rim 211 bridging indentations 280 and allowing the plug to be inserted into panel opening 212 without interference from ribs 281 (FIG. 22).

Dimpling of the side wall is performed in the same manner as described with earlier embodiments. A suitable tool with a head dimensioned to be received in cavity 215a is inserted into the cavity and pins or other plug-deforming elements are forced outwardly to form nubs or projections 245 that securely lock the plug in place and clamp sealant ring 216 between flange 219 and body panel 211 (FIG. 23), it being understood, of course, that the pins must be located so that such nubs are not formed in the recesses or indentations 280. During the subsequent heating or baking step, the thermoplastic sealant ring softens, and preferably expands into the broken-line position represented by numeral 216a in FIG. 23, forming an adhesive hermetic seal between the parts.

The magnetically-attractable sheet metal plug may therefore be used in exactly the same manner described in connection with the previous embodiments; however, it is considered a "universal" plug because it is also capable of being secured in the opening of a body panel without the use of tools and without recourse to a dimpling or deforming operation. Such alternate use is particularly applicable in those situations where the drain opening is awkward to reach and where such opening is not used for supporting or positioning the vehicle body during manufacture. For example, while most drain holes are located in the floor of a vehicle body, some drain holes are also located in generally vertical panels that are less accessible and require manual insertion of plugs without the use of bulky tools. The universal plug of this invention is suitable for both locations and both methods of attachment, thereby avoiding manufacturing problems and simplifying inventory requirements. Referring to the drawings, numeral 211' designates such a body panel having an opening 212' formed therein. Unlike opening 212, opening 212' is not precisely oval but is somewhat dumbbell-shaped, having end enlargements 290 that are slightly wider than the rounded end portions 218b of the plug's side wall 218 (FIGS. 18, 20). In addition, the body panel is provided with a pair of opposing integral tabs or shoulders 291 that project into portions of the spaces left by indentations 280 when the plug 215 is inserted into drain opening 212' (FIG. 18). Thereafter, the plug may be rotated a fraction of a full turn, as indicated by arrows 292 in FIGS. 20 and 21, to advance the inclined ribs 281 beneath the shoulders or tabs 291, thereby camming the plug into tight engagement with the body panel and locking the plug and panel tightly together.

Such rotation of the plug may be performed manually by a twisting force applied by the fingers, or by the palm of a hand, against the upstanding edge portions 219a of flange 219. Thereafter, during the heating or baking step, the thermoplastic sealant ring softens, expands, and permanently and hermetically seals the parts together.

The preferred embodiment of FIGS. 24–26 is similar to the embodiment of FIGS. 17–23 except that closure 314 is generally circular in outline and is adapted to be received either in a circular opening 312 of body panel 311 or in the modified opening 312' of panel 311', the latter having diametrically-disposed tabs or shoulders 391. Closure 314 includes a magnetically-attractable sheet metal plug 315 having a generally planar flange 319, a vertical side wall 318, and a bottom wall 317. In the illustration given, the bottom wall is domed at 317a in the same manner as the plug shown in FIG. 8. A thermoplastic sealant ring 316 is secured to the underside of flange 319 as previously described. The flange includes diametrically-opposed upstanding edge portions 319a to facilitate rotation of the plug into locking position when inserted into opening 312' of panel 311'. Like plug 215, plug 315 includes at least two perimetrically-spaced recesses or indentations 380 in its side wall 318. In each indentation is an elongated angular rib 381 formed integrally with the side wall of the plug and extending outwardly a distance no greater than a projected continuation of curvature of the circular outer surface of side wall 318 (FIG. 25). Therefore, in the same manner described in connection with the previous embodiment, the closure plug 315 may be inserted into panel opening 312' and then rotated to urge the angular ribs 381 into locking position beneath the tabs or shoulders 391 of panel 311'. After the plug is locked in place and the vehicle body is heated to bake its surface finish, the sealant ring 316 softens and expands to form a permanent hermetic seal between the closure plug and the body panel.

Figure 16:
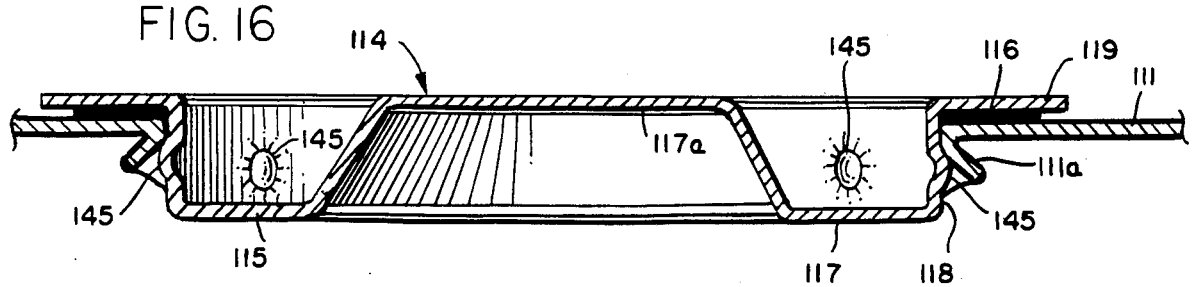

When plug 315 is instead inserted into circular opening 312 of panel 311, its side wall may be expanded as indicated in FIGS. 14–16 to form dimples that securely lock the plug and panel together.

The dimensions of the plugs 15, 115, 215, and 315 may be varied considerably, as already indicated by the variations in the shapes between the embodiments disclosed. In general, however, the side wall of a plug should have a height in the general range of 0.2 to 0.6 inches so that the nubs formed by operation of the deforming tool will be properly located beneath the floor plan or other panel of the vehicle body and will tightly clamp that panel against the flange and sealant ring of the closure. In that connection, it is to be noted that where the panel is provided with a lip (111a, 211a, 311a) the location of the nubs is slightly less critical because the same force generated to produce the nubs may also produce deformations in the lip (see FIGS. 16 and 23). The lip therefore provides a greater surface against which the outwardly projecting nubs may bear to perform their clamping or locking function.

While the thickness of the metal from which the plugs are formed would depend in part on the strength of the metal selected, it is believed that the thickness should in any event fall within the general range of 0.015 to 0.035 inches. As previously indicated, steel is believed to be the preferred material for fabrication of the plugs. The width and shape of the outwardly-projecting flanges of the plugs may be varied considerably but, in order to achieve proper clamping and sealing functions, a width within the range of 0.2 to 1.0 inches is believed suitable.

While in the foregoing I have disclosed embodiments of the invention in considerable detail for purposes of illustration, it will be understood by those skilled in the art that many of these details may be varied without departing from the spirit and scope of the invention.

I claim:

1. A vehicle body treatment process comprising the steps of forming a plurality of drain holes in floor panels of a vehicle body undergoing manufacture, each such drain hole having a downwardly-projecting rim extending thereabout; inserting upstanding pins of a vehicle body supporting and locating apparatus upwardly into said drain holes for supporting and precisely orienting said body during the manufacture thereof; removing said pins from said drain holes and immersing said body in a paint bath; removing said body from said bath and draining paint therefrom through said drain holes; inserting a closure plug downwardly into each of said drain holes following the draining of paint from said body, said plugs each being formed of sheet metal and being of inverted hat-shaped configuration with integral bottom and side walls defining an upwardly-opening cavity and a perimetric flange projecting outwardly from the top of said side wall, each of said plugs also having a thermoplastic sealant ring extending about the underside of said perimetric flange, and being inserted with its side wall extending downwardly through one of said drain holes, its bottom wall below the floor panel in which said hole is formed, its flange extending over said floor panel, and said sealant ring being interposed between said flange and said floor panel; thereafter mechanically locking said side wall of said plugs to said floor panels; and finally heating said vehicle body and said plugs to soften said rings and form hermetic seals between said flanges of said plugs and said floor panels.

* * * * *